(12) United States Patent
Klinghult (10) Patent No.: US 8,289,290 B2
(45) Date of Patent: Oct. 16, 2012

(54) TOUCH SENSING APPARATUS FOR A MOBILE DEVICE, MOBILE DEVICE AND METHOD FOR TOUCH OPERATION SENSING

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 491 days.

(21) Appl. No.: 12/505,618

(22) Filed: Jul. 20, 2009

(65) Prior Publication Data

US 2011/0012869 A1    Jan. 20, 2011

(51) Int. Cl.
*G06F 3/041* (2006.01)
(52) U.S. Cl. .......................... 345/173; 345/156
(58) Field of Classification Search .................. 345/156, 345/173, 175, 178
See application file for complete search history.

(56) References Cited

U.S. PATENT DOCUMENTS

| | | | |
|---|---|---|---|
| 6,342,915 B1* | 1/2002 | Ozaki et al. ................. | 348/61 |
| 2002/0149571 A1 | 10/2002 | Roberts | |
| 2004/0100448 A1 | 5/2004 | Moshrefzadeh | |
| 2009/0201246 A1* | 8/2009 | Lee et al. ..................... | 345/156 |

FOREIGN PATENT DOCUMENTS

| | | |
|---|---|---|
| EP | 1826657 A1 | 8/2007 |
| WO | 2006104745 | 10/2006 |
| WO | 2009146006 | 12/2009 |
| WO | 2010125432 | 11/2010 |

OTHER PUBLICATIONS

Co-pending U.S. Appl. No. 12/368,462, filed Feb. 10, 2009, entitled "Sensor, display including a sensor, and method for using a sensor".
Co-pending U.S. Appl. No. 12/502,371, filed Jul. 14, 2009, entitled "Touch sensing device, touch screen device including a touch sensing device, mobile device and method for sensing a touch on a touch sensing device".
International Search Report, corresponding to PCT/EP2010/050257, mailed on Mar. 17, 2011.
Written Opinion of the International Searching Authority, mailed on Mar. 17, 2011.

* cited by examiner

*Primary Examiner* — Ricardo L Osorio
(74) *Attorney, Agent, or Firm* — Renner, Otto, Boisselle & Sklar, LLP (57) ABSTRACT

The present invention relates to a touch sensing apparatus for a mobile device, a mobile device and a method for touch operation sensing to reliably sense an applied force. The touch sensing apparatus comprises a touch sensing section for sensing a force experienced in a touch sensing direction of said touch sensing section and outputting a signal corresponding to said force; an acceleration obtaining section for obtaining an acceleration of said touch sensing apparatus in said touch sensing direction; and a signal correction section for correcting said signal corresponding to said sensed force using said obtained acceleration.

14 Claims, 6 Drawing Sheets

TOUCH SENSING APPARATUS FOR A MOBILE DEVICE, MOBILE DEVICE AND METHOD FOR TOUCH OPERATION SENSING

FIELD OF THE INVENTION

The present invention relates to a touch sensing apparatus for a mobile device, a mobile device and a method for touch operation sensing, and in particular to a touch sensing apparatus, mobile device and method to correctly determine a force applied in a touch sensing direction.

BACKGROUND

Different kinds of sensors serving as user interfaces and devices, such as mobile devices, are known in the art for sensing an input action of a user. In standard touch sensors, the input is performed by touching a sensor surface with a finger or stylus. In this way, these touch sensors provide a user interface or man-machine interface to control various functions of the device having a touch sensor incorporated therein.

Known touch sensors work by reacting to a change in resistance or capacitance affected by the presence of a finger or stylus of a user. A capacitive touch sensor or touch screen panel is a sensor typically made of glass coated with a transparent conductor. For example, known touch sensors, e.g. available from Cypress Semiconductor, comprise two layers with capacitive components, wherein these components are connected with each other horizontally in the first layer and vertically in the second layer to provide a matrix structure enabling to sense a position in x,y-coordinates of where the sensor is touched. In capacitive touch panels, the capacitive components of one layer forms one electrode of a capacitor and the finger or stylus forms another electrode.

Recent applications, such as multi-touch applications, require that more than one position on a touch sensor is touched and sensed, e.g. to determine a section of an image on a display that is to be magnified. As applications become more complex, new improved user interfaces are needed that allow additional input parameters.

For example, it is envisaged to use the force applied from the finger to a touch panel of a touch sensor as an input parameter.

Therefore, it is desirable to provide a touch sensing apparatus, mobile device and method for touch operation sensing, which allow to reliably sense an applied force.

DISCLOSURE OF INVENTION

Such touch sensing apparatuses, mobile devices and methods are defined in the independent claims. Advantageous embodiments are defined in the dependent claims.

An embodiment of the invention provides a touch sensing apparatus for a mobile device comprising a touch sensing section for sensing a force experienced in a touch sensing direction of the touch sensing section and outputting a signal corresponding to the force. Further, the touch sensing apparatus comprises an acceleration obtaining section for obtaining an acceleration of the touch sensing apparatus in the touch sensing direction and a signal correction section for correcting the signal corresponding to the sensed force using the obtained acceleration. Accordingly, by correcting the signal using the acceleration of the touch sensing apparatus itself, an accurate and reliable corrected signal indicating the actual applied force by a user can be obtained. Therefore, if the touch sensing apparatus is used as an user interface, false triggering or a false level input to the user interface can be avoided, which otherwise could annoy the user. For example, if the user puts his/her finger lightly on the touch sensing apparatus and moves the touch sensing apparatus, while walking, jogging or sitting in an accelerating car, the force sensed by the apparatus constitutes a complex combination of the force applied by the user and the accelerated movement of the apparatus. However, by obtaining the acceleration of the apparatus, the force actually applied by the user can be estimated.

In one embodiment, a cover layer defining a touch area to which the force is to be applied is provided in the touch sensing apparatus. Accordingly, a user interface section is defined that may be used to apply a force thereon as input parameter.

In one embodiment, the touch sensing apparatus is further provided with a support frame, wherein the cover layer is adapted to change its shape or position relative to the support frame when a force is applied. Accordingly, the touch sensing apparatus is constructed in a way so that parts of it are affected by a force and deflect, bend or otherwise change shape.

In one embodiment, a touch position sensing unit of the touch sensing section is provided for sensing a touched position. For example, the position may be a position touched on the touch area of a cover layer that may form part of the touch position sensing unit. Accordingly, x,y-coordinates of the position may be obtained providing input parameters for the touch sensing apparatus.

In one embodiment, a controller is provided adapted to control supply of power to at least one of the touch sensing section, acceleration obtaining section and signal correction section depending on whether the touch position sensing unit senses a touch or not. Accordingly, power consumption may be reduced by monitoring whether a user wants to operate the touch sensing apparatus or not.

In particular, power is supplied to at least one of the touch sensing section, acceleration obtaining section and signal correction section, if a touch is sensed by the touch position sensing unit. For example, the touch sensing section comprises the touch position sensing unit and a force sensing unit, wherein the touch position sensing unit is always on to be ready to sense a touch, and the force sensing unit is only turned on once the touch position sensing unit senses a touch.

In one embodiment, the acceleration obtaining section comprises an accelerometer to measure acceleration in three directions of a three-dimensional coordinate system. Accordingly, a conventional accelerometer may be used as acceleration obtaining section, which is already present in some available mobile devices so that costs may be reduced by re-using the same for the above-described purpose.

In one embodiment, a storage section for storing a condensation value is provided in the touch sensing apparatus to compensate for differences between the touch sensing direction and one of three directions of the accelerometer, such as x, y, z-directions in a Cartesian coordinate system. Accordingly, it is not necessary that the touch sensing direction coincides with one of the directions measured by the accelerometer, and a compensation for this difference can be obtained, e.g. in the lab, in advance and stored.

The previously described cover layer is in one embodiment at least partly made of a transparent, i.e. light-transmissive material. Accordingly, a display assembly or similar may be placed underneath and can be viewed by the user.

In one embodiment, the touch sensing apparatus further comprises a display assembly. The display assembly may be placed between the cover layer and the touch sensing section or may be placed below the cover layer and the touch sensing section. Accordingly, a user may be prompted by a message or other information displayed on the display assembly to touch the touch sensing apparatus, i.e. apply a certain force so as to enable an input operation in z-direction.

In one embodiment, the touch sensing section comprises at least one layer including electrically conductive material to sense a force applied to the layer by a change in its resistivity and in another embodiment, the touch sensing section comprises a first and a second winding placed on top of each other, wherein a voltage can be induced in one of the windings, if the distance between them is changed due to a force on the touch sensing section.

According to another embodiment, a mobile device is provided comprising one of the above-described touch sensing apparatuses. Accordingly, a mobile device may be provided with a novel type of user interface enabling to reliably sense an input operation of a user.

In one embodiment, a mobile device is provided, such as a mobile phone, comprising a force-sensitive touch sensor for sensing a force experienced in a touch sensing direction of the force-sensitive touch sensor and outputting a signal corresponding to the force, as well as an accelerometer for measuring an acceleration of the touch sensing apparatus in the touch sensing direction, and a microcontroller adapted to correct the signal corresponding to the sensed force using the obtained acceleration.

In another embodiment of the invention a method is provided for touch operation sensing. The method comprises the steps of sensing a force experienced in a touch sensing direction of a touch sensing apparatus and outputting a signal corresponding to the force, obtaining an acceleration of the touch sensing apparatus in the touch sensing direction, and correcting the signal corresponding to the sensed force using the obtained acceleration. Accordingly, by correcting the signal using the acceleration of the touch sensing apparatus, an accurate and reliable corrected signal indicating the actual applied force by a user can be obtained.

BRIEF DESCRIPTION OF THE DRAWINGS

Embodiments of the invention will be described with respect to the following appended figures.

Embodiments of the invention are described with reference to the figures. It is noted that the following description contains examples only and should not be construed as limiting the invention.

In the following, similar reference signs indicate similar or same elements.

Figure 1A:
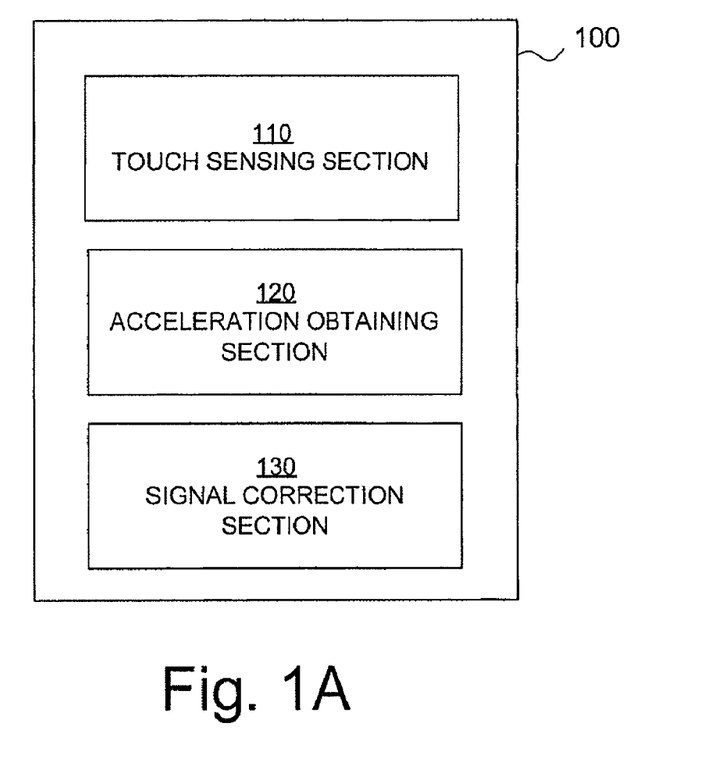
FIG. 1A illustrates a touch sensing apparatus and elements thereof according to an embodiment of the invention.

FIG. 1A illustrates elements of a touch sensing apparatus 100 according to an embodiment of the invention. In detail, the touch sensing apparatus 100 comprises a touch sensing section 110, an acceleration obtaining section 120, and a signal correction section 130.

The touch sensing section 110 senses a force applied in a touch sensing direction which ordinarily corresponds roughly to a direction perpendicular to a touch area of a cover layer forming an input plane, for example. Once a force is sensed, the touch sensing section 110 converts this force into a signal, and outputs a signal corresponding to the force.

Figure 1B:
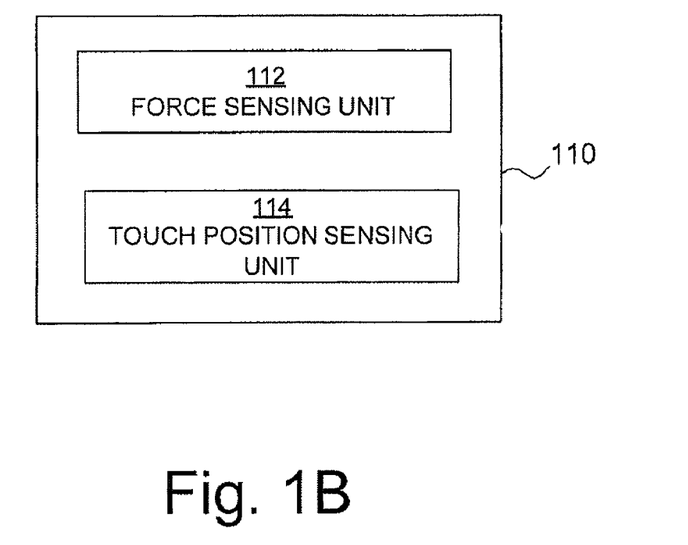
FIG. 1B illustrates a touch sensing section of a touch sensing apparatus in detail.

In particular, the touch sensing section 110 comprises a force sensing unit 112 and a touch position sensing unit 114 as can be seen in FIG. 1B, wherein the force sensing unit 112 senses a force, and the touch position sensing unit 114 senses a position touched.

Several different touch sensing sections for sensing a force and/or a position are described, such as a touch sensing device with two windings on top of each other measuring force by using an induction effect as described in U.S. Ser. No. 12/502, 371, a sensor using resistance and capacitance measurements to obtain an approximation of the applied force and an x, y-position as described in U.S. Ser. No. 12/368,462 and other sensors using a resistive sensing like a strain gauge sensor or a force sensing resistor (FSR). Some of these touch sensing sections will be described below to illustrate the detailed operation of the touch sensing apparatus 100.

It is noted that the touch sensing apparatus 100 is not limited to the above-mentioned touch sensing sections but any known touch sensing section may be used in combination with the touch sensing apparatus 100.

Most touch sensing sections are based on the following two cases. The force from a finger applied at a front panel or cover layer of the touch sensing apparatus makes the layer deflect, whereupon this deflection can be measured. Further, the force from a finger applied to a front panel or a cover layer may result in a reacting force along the edges of the layer or at discrete points in the corners of the layer, whereupon the force can be measured.

It is noted that even a pressure increase in a liquid crystal display (LCD) comprising a fluid of liquid crystal molecules due to a force applied to the liquid crystal display can be used to estimate the force.

The acceleration obtaining section 120 obtains a value of acceleration of the touch sensing apparatus 100 in the touch sensing direction. For example, the acceleration obtaining section 120 is an accelerometer that is increasingly being incorporated into personal electronic devices, such as smart phones. One example of such an accelerometer is the LIS302DL of STMicroelectronics which is a 3-axis MEMS motion sensor.

The acceleration obtaining section 120 is adapted to obtain the acceleration of the touch sensing apparatus 100 by being mounted or fixed to the housing or other support structure of the touch sensing apparatus 100, for example. In this way, acceleration and thus a force experienced by the touch sensing apparatus 100 can be measured. As mentioned above, when a user carrying the touch sensing apparatus or a mobile device incorporating this apparatus walks, jogs or sits in an accelerating car, the touch sensing apparatus 100 will be accelerated which will result in a force according to the well-known equation F=m*a.

In particular, if the touch sensing apparatus is accelerated or decelerated in the z-direction, a front panel or a cover layer, or in the case of a smart phone the whole LCD (liquid crystal display) package, acts as a moving mass m resulting in a force in the z-direction. This force may be sensed and considered by the touch sensing section as a force applied by a user. To avoid false triggering of the touch sensing section 110 serving as user interface, such acceleration of the touch sensing apparatus should be taken into account when sensing a force to be used as input parameter.

This is done in the signal correction section 130, which corrects the signal corresponding to the sensed force, i.e. a force applied by a user or a force due to acceleration or deceleration of the touch sensing apparatus 100 or a combination thereof, by using the obtained acceleration.

In case of optimal alignment of the touch sensing section 110 and the acceleration obtaining section 120 so that an experienced and accelerating force, respectively, are measured in the same direction, i.e. the touch sensing direction, the applied force by a user may be simply obtained by subtracting the force due to acceleration from the total experienced force sensed by the touch sensing section 110.

In practice, if the acceleration obtaining section 120 is not optimally aligned to the touch sensing section 110, this may be compensated for by a compensation value that can be obtained previously in the lab or by some other calibration procedure and may be stored in a storage section, as will be described below in more detail.

It is understood that the acceleration obtaining section 120 is not limited to an accelerometer mounted or fixed in the touch sensing apparatus 100. For example, if the touch sensing apparatus, such as a smart phone or navigation device, is provided in a vehicle and attached thereto, also an external accelerometer of the vehicle may be used to obtain the acceleration of the touch sensing apparatus and may then input corresponding acceleration data to the touch sensing apparatus. In this case, the acceleration obtaining section 120 acts as an interface to receive an acceleration from an external device, such as from an accelerometer of a vehicle directly or through a controller of the vehicle.

Therefore, the signal corresponding to the force sensed and then output by the touch sensing section 110 can be corrected for a movement of the touch sensing apparatus 100 enabling reliable estimation of a force applied by a user.

Figure 2:
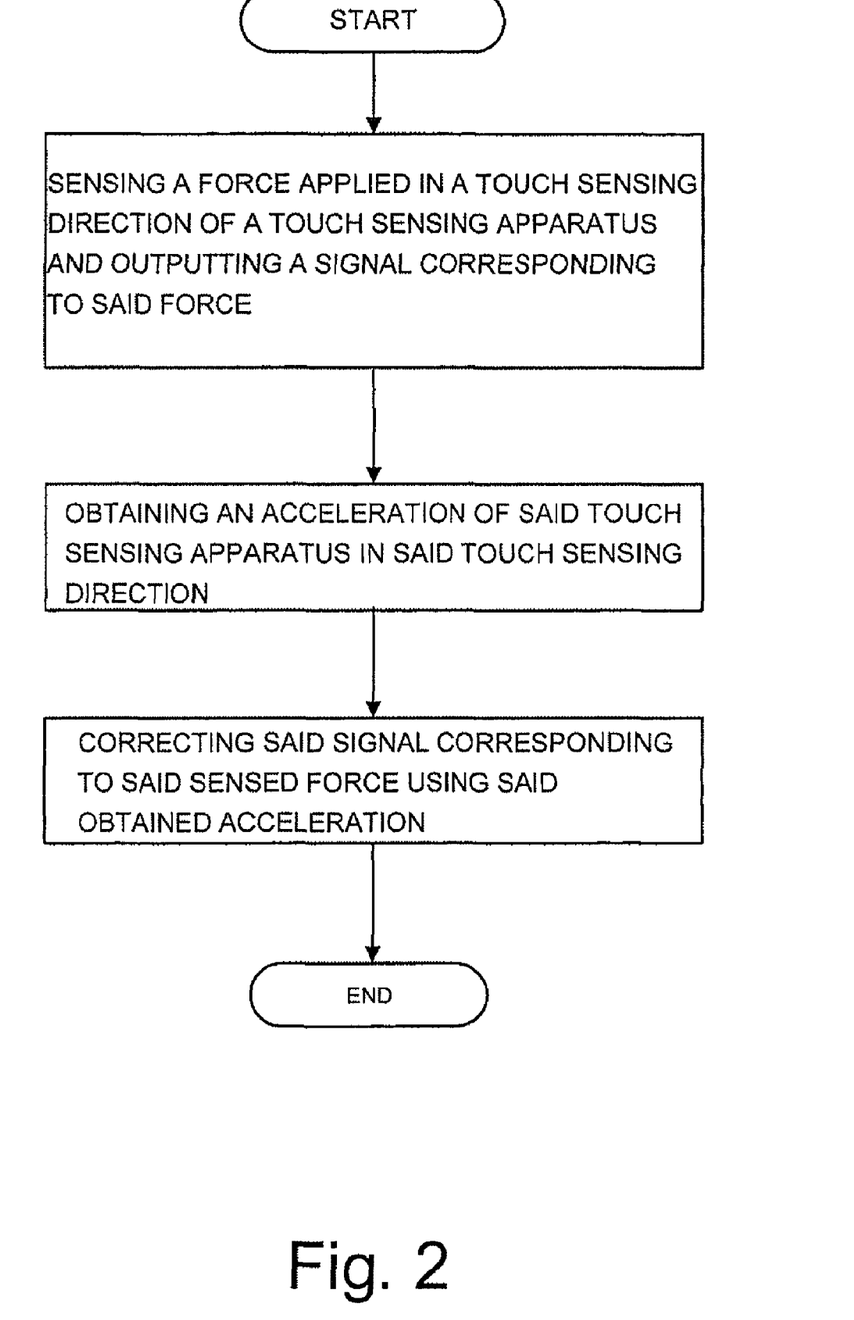
FIG. 2 illustrates a flow diagram of a method for sensing a force on a touch sensing apparatus according to an embodiment of the invention.

In the following, operations of a method for sensing a force experienced in the touch sensing direction, such as in the touch sensing direction of the touch sensing section 110, will be described with respect to FIG. 2.

The method for touch operation sensing comprises, as a first step S210, sensing a force experienced in a touch sensing direction of a touch sensing apparatus, such as the z-direction as described above, and outputting a signal corresponding to the force. As mentioned above, this force may be a combination of a force applied by a finger or a stylus of a user and a force due to acceleration or deceleration of the apparatus. In the following only acceleration is considered since deceleration is simply negative acceleration and thus is also comprised in the expression acceleration so that acceleration should be understood as negative or positive acceleration.

Therefore, in step S220, an acceleration of the touch sensing apparatus, such as the touch sensing apparatus 100, in the touch sensing direction is obtained. From this acceleration a force can be calculated taking into account the mass if the moveable parts of the apparatus, wherein this force is independent of a force applied by the user.

In step S230, the signal corresponding to the sensed force is corrected using the obtained acceleration. For example, as described above, the force resulting from the acceleration is subtracted from the sensed force so that the force applied by the user by his/her finger or stylus is obtained that indicates an input operation of the user. As a result, reliable input operation is achieved.

Figure 3:
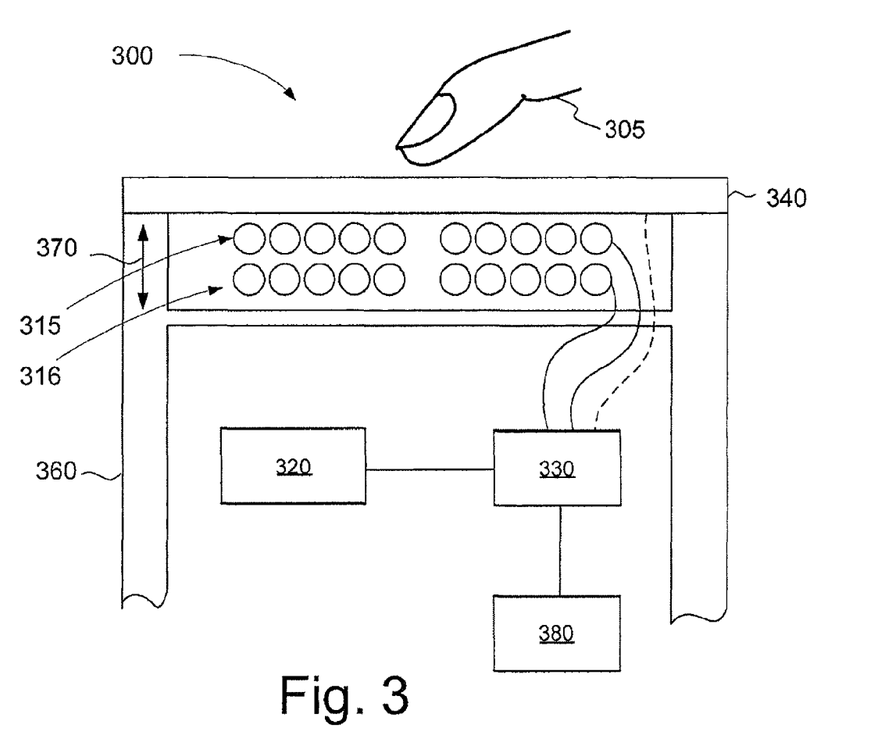
FIG. 3 illustrates a touch sensing apparatus according to another embodiment of the invention, in particular using two windings as touch sensing section to measure an applied force through inductance.

FIG. 3 illustrates a touch sensing apparatus 300, which may be used in a mobile device, according to an embodiment of the invention.

In detail, the touch sensing apparatus 300 comprises as a force sensing unit of a touch sensing section a first winding 316 and a second winding 315 and a cover layer 340. The touch sensing apparatus 300 further comprises a controller 330, acceleration obtaining section 320 and storage section 380 as well as a support frame 360.

The cover layer 340 may include a touch position sensing unit and thus may constitute together with the two windings 315 and 316 a touch sensing section with a force sensing unit and a touch position sensing unit. The cover layer 340 is a top layer defining a touch area, onto which a force can be applied by a finger 305, a hand, a stylus or other object.

The first winding 316, such as a winding of a coil, is placed below the cover layer 340 and extends over at least a part of the touch area. The second winding 315 is placed between the first winding 316 and the cover layer 340 and overlaps at least partly with a first winding 316. The windings 315, 316 expand in a plane to enable thin planer-shaped coils. If the windings are assumed to be substantially of a circle shape, the first winding 316 and/or the second winding 315 may expand in radial direction in the plane, which is substantially parallel to the cover layer 340. However, any type of conductor loop can be used as a winding that produces a magnetic field when a current is supplied.

The two windings 315 and 316 of FIG. 3 are spaced apart from each other so as to form a spacing between them in an axial direction, which is a vertical direction in the image plane and is defined as the z-direction in the following. In particular, the first and second windings 316, 315 and the cover layer 340 are arranged so that a coupling of a magnetic field generated by a current supplied to the first winding 316 varies in response to a force onto the touch area changing the spacing.

For example, the current for producing a magnetic field of the first winding 316 is supplied thereto by a controller 330 electrically connected to the first winding. In detail, when a current is supplied to the first winding 316 and a force on the touch area changes the spacing between the first winding 316 and the second winding 315 due to a deflection of the cover layer 340, for example, a voltage is induced in the second winding 315. If an alternating current is used, the principles of a transformer largely apply to the force sensing unit and thus an induced voltage may be obtained by the coupling coefficient K according to the following formula:

$$|V_{sec}| := \omega \cdot I_{prim} \cdot K \cdot \sqrt{L1 \cdot L2}$$

Here the coupling coefficient K is for an air-winded transformer determined by the spacing between the windings and $V_{sec}$ is the voltage in the second winding, i.e. the secondary winding of a transformer, $\omega$ is the frequency and $I_{prim}$ is the current in the first winding, i.e. primary winding of a transformer and L1 and L2 are the inductances of the first and second windings, respectively. Accordingly, a force on the touch sensing section may change the spacing and thus the coupling coefficient K.

For example, the coupling of the magnetic field generated by the current in the first winding 316 constitutes the coupling coefficient, or any other parameter proportional to the coupling coefficient or the induced voltage. Therefore, a force applied to the cover layer 340 can be estimated by measuring the voltage induced in the second winding.

For example, when a force is applied by the finger 305 to the cover layer 340, the cover layer deflects due to the force and changes its shape and presses down the second winding 315 closer to the first winding 316. The induced voltage of the second winding 315 corresponds to the signal output by the touch sensing section and can then be received and determined by the controller 330.

In the above description, it has been assumed that the cover layer 340 is flexible and/or resilient and deflects due to the presence of a force. However, alternatively, the cover layer 340 may also be a relatively stiff layer and parts of the support frame 360 of the touch sensing apparatus 300, such as the part 370 indicated by the arrow, may be flexible or elastic so that the spacing between the first and second windings constituted by an air gap or filled out with a preferably elastic isolating material, changes according to the force on the cover layer 340. In other words, the side wall 370 of the touch sensing apparatus 300 may be made flexible or elastic so that when applying a force to the touch area of the cover layer 340, the side wall 370 can be shortened in z-direction to change the spacing. In particular, the support frame 360 is adapted so that the cover layer 340 can change its relative position to the non-flexible or non-elastic parts of the support frame or similarly the first winding 316 when a force is applied.

As discussed above, the force applied by the finger 305 may not be the only force exerted on the cover layer 340 and the second winding 315, which are arranged to be moveable, but also a force due to an acceleration of the touch sensing apparatus 300 in z-direction may be sensed.

Therefore, the acceleration obtaining section 320 is provided to measure an acceleration of the touch sensing apparatus 300 in the z-direction constituting the touch sensing direction in the present case so that this force may be subtracted from the force measured by the force sensing unit 315, 316. The force obtained by the acceleration obtaining section 320 or a corresponding signal thereof is transmitted to the controller 330 which may also be adapted to function as a signal correction section to correct a signal corresponding to the sensed force from the second winding corresponding to an induced voltage by subtracting the force associated with the measured acceleration.

In FIG. 3, the touch sensing direction is defined by the structure and position of the two windings 315 and 316 and the cover layer 340. In an optimal alignment, the touch sensing direction thus corresponds to the z-direction perpendicular to the cover layer. In other words, even if the finger 305 applies a force with a component in the x-direction (the horizontal direction in the image plane), the force sensing unit comprising the two windings only detects a z-component due to its structure being sensitive to the z-direction.

On the other hand, for a very accurate correction using the acceleration obtaining section 320, the direction in which the force is measured by the acceleration obtaining section 320 should correspond to the touch sensing direction of the touch sensing section comprising the force sensing unit 315, 316. However, if these directions are not optimally aligned, for example the measurement direction of the acceleration obtaining section is off by 5 degrees, this misalignment may be easily corrected by storing in the storage section 380 a compensation value to compensate for the difference between the touch sensing direction of the force sensing unit and the force measurement direction of the acceleration obtaining section 320. Therefore, the storage section 380 may include a look-up table including different compensation values.

For example, if the acceleration obtaining section 320 is a three-axis accelerometer being able to measure forces in the x, y, z-directions, a compensation value may be stored compensating for the difference between the z-direction of the accelerometer and the touch sensing direction of the force sensing unit.

The compensation value may be determined in the lab during the development phase and then stored in the storage section, which can be a ROM, RAM, EEPROM, flash memory or the like. Therefore, no production calibration should be needed.

The compensation value can then be retrieved from the storage section 380 from the controller 330 to correct the signal corresponding to the sensed force and to carry out compensation.

It has been mentioned above that the cover layer 340 may comprise a touch position sensing unit or may constitute the touch position sensing unit itself. In one embodiment, the controller 330 is adapted to control supply of power to at least the touch sensing section, in particular the force sensing unit 315, 316, the acceleration obtaining section 320 and the signal correction section, here the controller 330, depending on whether the touch position sensing unit senses a touch or not.

In detail, power is supplied to at least one of the above-mentioned sections if a touch is sensed by the touch position sensing unit and indicated to the controller (see dashed line) so as to avoid supplying all sections continuously with power in a case, in which no user operation on the touch sensing apparatus 300 is performed. The touch position sensing unit may be any kind of x-y touch sensor or touch panel, such as a capacitive touch sensor described above or the touch sensors below described with respect to FIGS. 5 and 6.

As described above, the touch sensing section 315, 316, 340 enables the estimation of forces of different magnitudes which can be used as input parameters for different input operations. For example, if a relative measurement of the forces is required as is the case in many applications, a user may press with a certain force to indicate a single click and with double the force to indicate a double click so that calibration is not necessarily needed. Hence, the touch sensing apparatus 300 may be used as a touch pad or a touch screen, if a display is provided between the cover layer 340 and the two windings. For example, in the case of the touch pad, an external display may be connected to the touch sensing apparatus 300, wherein the display may show a scroll list and the speed of scrolling up and down the list is determined by the magnitude of the force applied to the touch sensing apparatus 300.

In particular, with the touch sensing apparatus 300, it is possible to make the speed of scrolling up or down solely dependent on the applied force, since any acceleration of the touch sensing device 300 during the input operation of the user is taken care of by the controller 330 taking into account the acceleration of the touch sensing apparatus 300 measured by the acceleration obtaining section 320. Therefore, the sensed force or more particular a corresponding electric signal from the force sensing unit 315, 316 can be corrected and a corrected signal corresponding to the actual applied force by a user can be extracted. Consequently false triggering or erroneous speeding up or down of scrolling can be avoided.

In the following, a touch sensing apparatus according to another embodiment of the invention is described with respect to FIG. 4. The touch sensing apparatus 400 shown in FIG. 4 comprises a touch sensing section 410, an acceleration obtaining section 420 and a signal correction section 430 and optionally a display assembly 490, such as an LCD device.

The signal correction section 430 may again be realized by a controller processing incoming signals, such as the signal corresponding to a sensed force from the touch sensing section 410 and the signal from the acceleration obtaining section 420 and for details, it may be referred to the controller 330 and the signal correction section 130 of FIGS. 1A and 3. Similarly also the acceleration obtaining section 420 is basically the same as the acceleration obtaining sections 120 and 320 and it may be referred to the previous explanations to avoid unnecessary repetition.

Reference numeral 460 designates a support frame, which is only shown partly for illustrated purposes and may be present along the outline of the touch sensing section 410. The touch sensing section 410 will now be described in more detail with reference to the touch sensing sections 410 and 410' of FIGS. 5 and 6.

Figure 4:
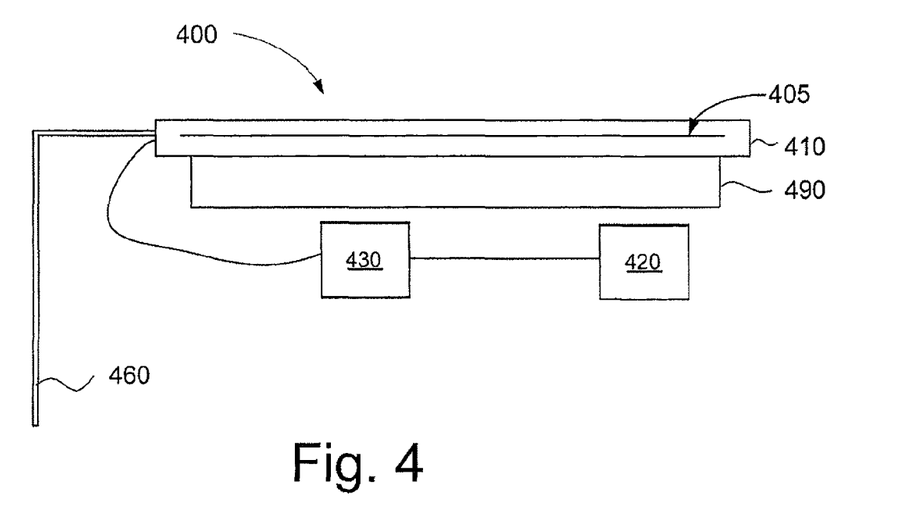
FIG. 4 illustrates a touch sensing apparatus according to another embodiment of the invention, in particular using a layer with a pattern of electrically conductive material as a touch sensing section that changes its resistance when a force is applied.

In FIG. 4, the touch sensing section 410 may also serve as a cover layer at least partly made of transparent material so that a user can view the display assembly 490 underneath. To be light-transmissive and fulfil its function of sensing a force experienced in a touch sensing direction, i.e. approximately perpendicular to element 410, a layer 405 including a pattern of electronically conductive material, such as ITO (indium tin oxide), is contained in the touch sensing section 410.

Figure 5:
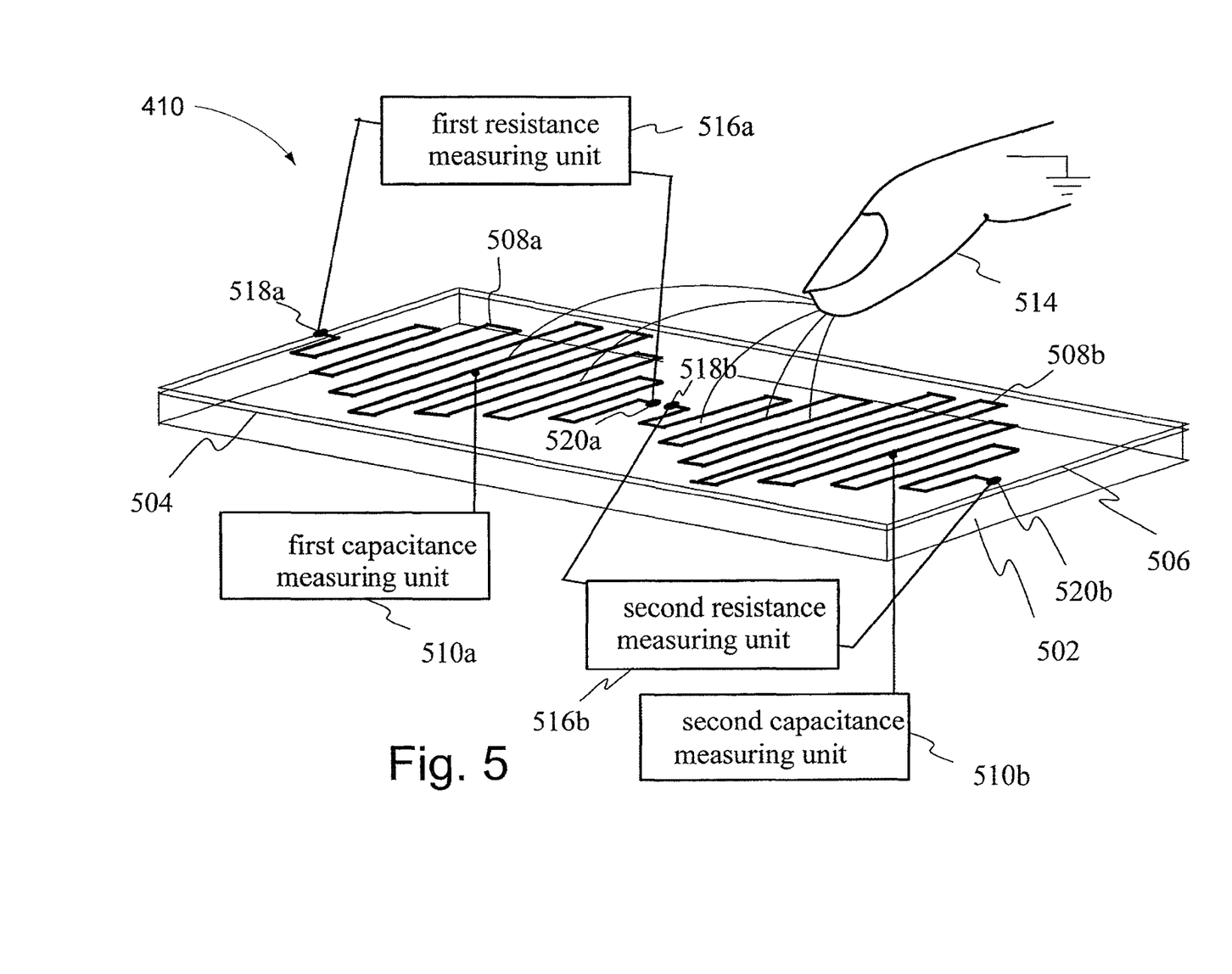
FIG. 5 illustrates an example of a touch sensing section using resistance measurements as well as capacitance measurements.

An example of a touch sensing section that may be used as touch sensing section 410 is shown in FIG. 5. The touch sensing section 410 of FIG. 5 comprises a front side 504 of an isolating support 502 and a membrane 506 including a pattern 508a, 508b of ITO. In particular, the pattern 508a, 508b is provided on the front side 504 of the insulating support 502 and includes a first portion 508a and a second portion 508b.

A first capacitance measuring unit 510a serving as touch position sensing unit is electrically connected to the ITO portion 508a to measure the capacitance between the portion 508a and its surrounding environment, which may at one point in time include a finger 514, hand or other object (not shown). A first resistance measuring unit 516a serving as a force sensing unit is connected through contact points 518a, 520a to measure the resistance between the pair of contact points 518a, 520a of the pattern portion 508a. Thus, a finger 514 can be detected in the proximity of the portion 508a by the first capacitance measuring unit 510a, and the force exerted by the finger 514 on the membrane 506 can be estimated by the first resistance measuring unit 116a.

In detail, when a force is applied, the membrane 508, which is resilient, for example, is bent due to the force applied by the finger 514, and the length of the ITO pattern 508a between the contact points 518a and 520a is modified. Thanks to the piezoresistive properties of the ITO conductive pattern, the resistance is modified and can be measured by the first resistance measuring unit 516a so that an applied force can be detected and estimated.

An output signal of the resistance measuring unit 516a representing the resistance may be converted to a signal representing a force. Depending on the force different actions may be triggered in the controller of the touch sensing apparatus acting as a user interface. For example, if a sensed force exceeds a predetermined threshold, a first action is carried out and if the sensed force does not exceed the predetermined threshold, a second action is carried out.

However, as mentioned above, due to the resilient, flexible or otherwise moveable property of at least parts of the touch sensing section, such as the membrane 506 in FIG. 5, the first resistance measuring 516a may also measure a force, if a touch sensing apparatus including the touch sensing section 410 is accelerated, in particular in z-direction. This force may exceed a predetermined threshold, although a user did not apply a force so that the first action is carried out erroneously. To avoid false triggering, the acceleration due to a movement of the touch sensing apparatus 400 is measured independently in FIG. 4 and the force component in the z-direction may be subtracted from the force measured by the first resistance measuring unit 516a.

Similarly, a second capacitance measuring unit 510b is electrically connected to a second ITO pattern 508b in order to detect the presence of a finger 514 in the vicinity of the portion 508b. Furthermore, a second resistance measuring unit 516b is connected between the two contact points 518b, 520b in order to measure the resistance between the pair of contact points 518b, 520b of the second portion 508b. Therefore, not only the presence of a finger 514 on, or in the vicinity or proximity of, the touch sensing section 410 can be detected and the force applied by the finger 514 can be reliably estimated, but also the position of the finger 514 on the touch sensing section 410.

Alternatively (not shown in FIG. 5), one force measurement may be obtained by only one resistance measuring unit, while several position measurements by a plurality of capacitance measuring units may be obtained.

Figure 6:
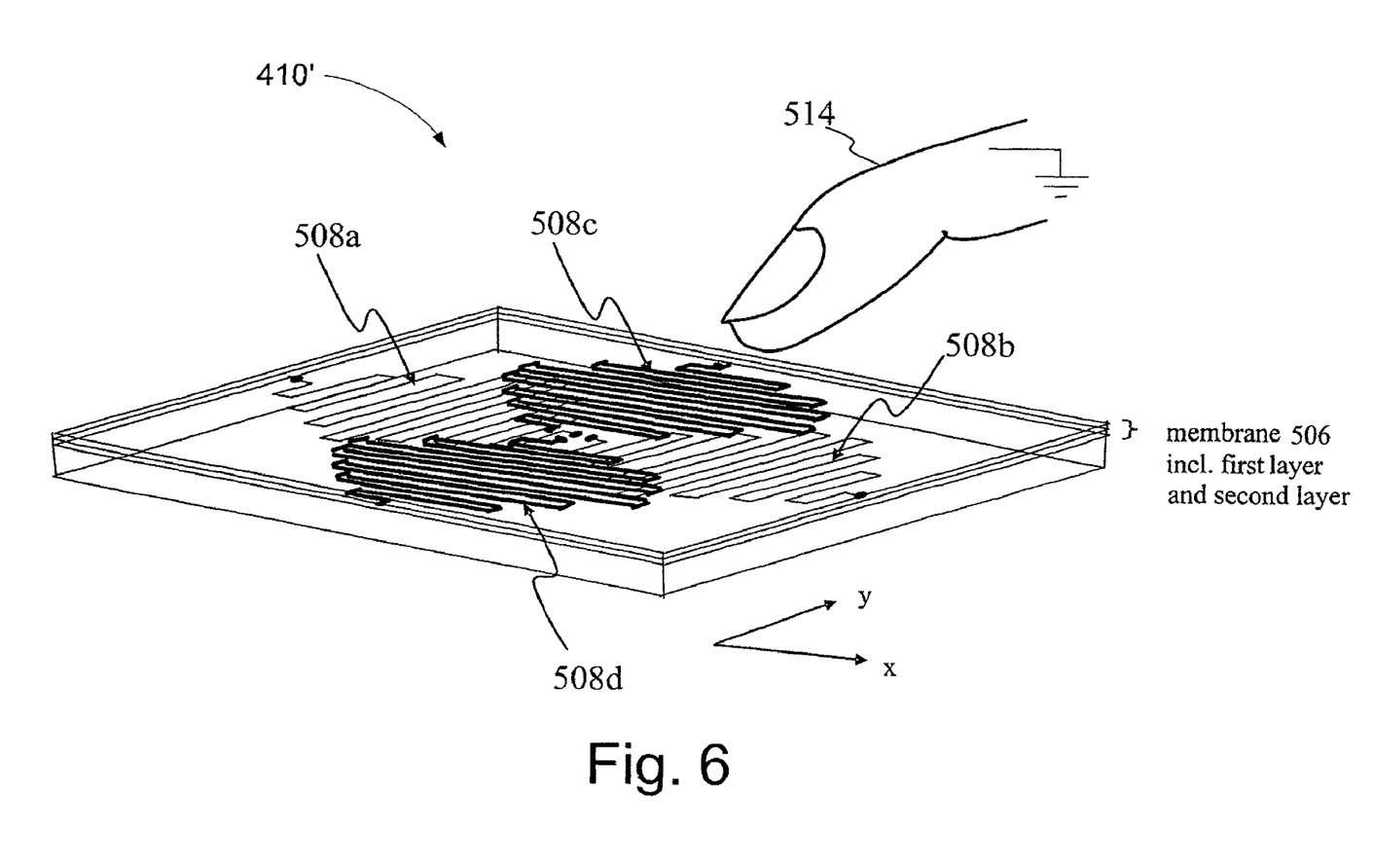
FIG. 6 illustrates another example of a touch sensing section.

FIG. 6 illustrates another example of a touch sensing section. The touch sensing section 410' of FIG. 6 comprises, in addition to the previously discussed ITO patterns 508a and 508b contained in a first layer, a second layer containing a third ITO pattern portion 508c and a fourth ITO pattern portion 508d. Similar to the touch sensing section 410 of FIG. 5, capacitance measuring units (not shown in FIG. 6) can be provided to measure the capacitance between each ITO pattern portion 508a, 508b, 508c, 508d and their respective surrounding environment and resistance measuring units (not shown in FIG. 6) can be provided to measure the resistance between the contact points of each ITO pattern portion in order to estimate a force exerted on the membrane 506.

The capacitance measuring units electrically connected to each of the ITO pattern portions 508a, 508b provide an indication of the position of the finger 514 on the membrane along the x-direction. Further, the capacitance measuring units electrically connected to each of the ITO pattern portions 508c, 508d provide an indication of the position of the finger 514 on the membrane 506 in the y-direction. The ITO pattern portions may be in the form of a serpentine or of any other form.

In another embodiment, the touch sensing apparatus 100, 300 or 400 is incorporated in a mobile device, such as a cellular phone, smart phone or other type of mobile phone, or portable computer. The implementations of the touch sensing apparatus are clearly not limited to mobile devices but incorporation in a mobile device is particularly advantageous, since these devices are usually small and require intelligent user interfaces or man-machine interfaces to trigger various functions. Therefore, incorporating the touch sensing apparatus which can be made small and provide reliable force and position sensing, in a mobile device is advantageous. Consequently, the touch sensing apparatus is also usable as a controller or joy stick of a gaming system. In particular, in gaming controllers for interactive games where movement of the player, e.g. by his/her arm, is monitored, acceleration of the controller and a force applied by a player as input operation can be separated.

Figure 7:
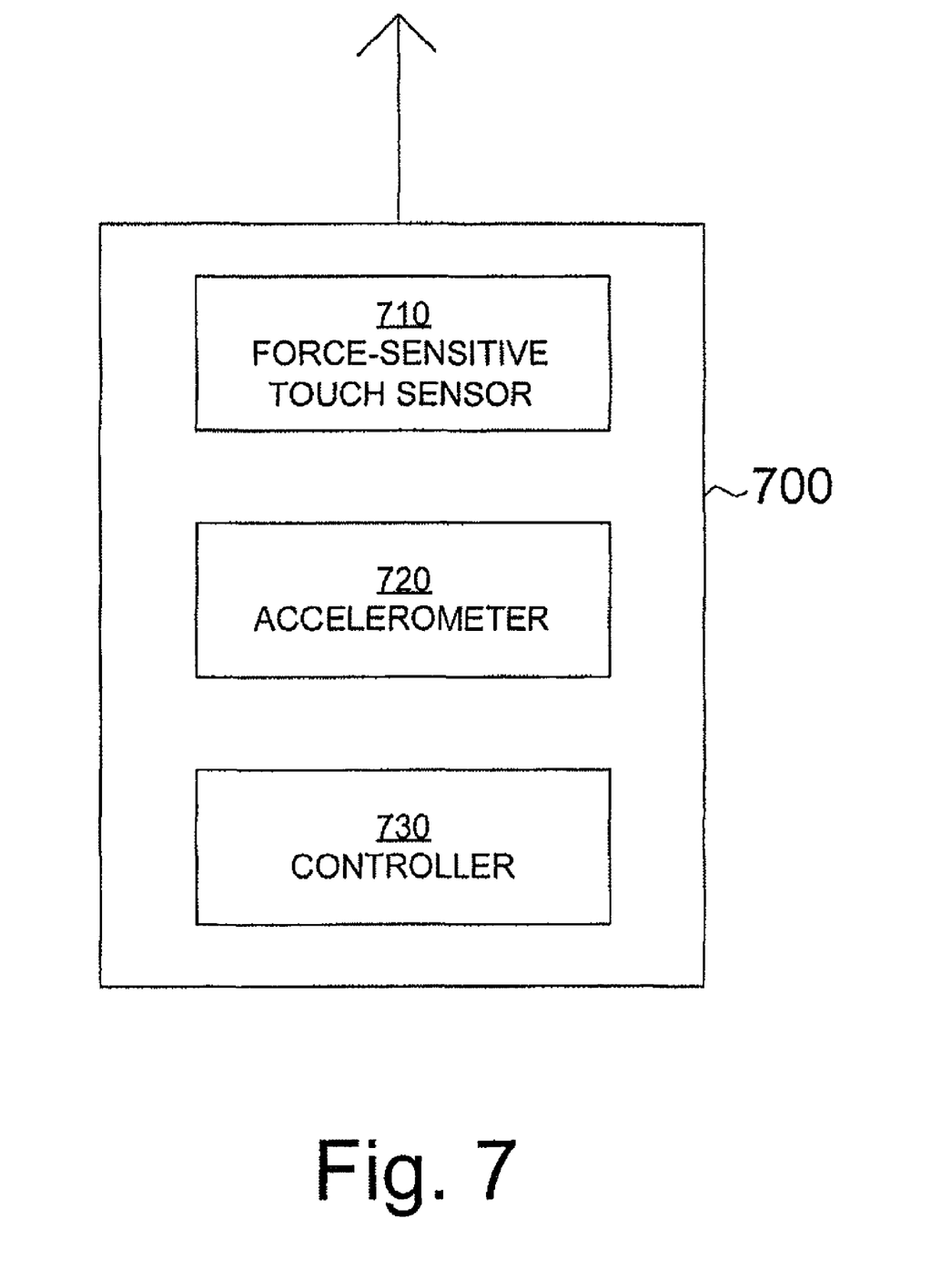
FIG. 7 illustrates an example of a mobile device, such as a mobile phone, realizing functions of a touch sensing apparatus.

The features of the touch sensing apparatuses described above can be easily integrated in mobile phones, for example as shown in FIG. 7.

FIG. 7 illustrates elements of a mobile device, such as a mobile phone, performing the functions of a touch sensing apparatus. In detail, the mobile phone 700 of FIG. 7 comprises a force-sensitive touch sensor 710, an accelerometer 720 and a controller 730. In this example, an existing controller of a mobile phone can be adapted to carry out the function of the signal correction section. Since conventional controllers comprise at least a processor, the controller can be adapted to correct a signal received from a force-sensitive touch sensor 710 by taking into account the acceleration experienced by the mobile phone 700 and measured by an accelerometer 720 which is already present in several available mobile phones.

Therefore, to realize the features of a touch sensing apparatus in a mobile phone, at least a force-sensitive touch sensor 710 is provided having the same features as the touch sensing sections 110, 310 and 410 described above. Consequently, a force applied by a user can be obtained accurately with only little additional hardware needed so as to provide a reliable user interface, which signal is independent of the movement of the mobile phone.

The description above has been explained with respect to several individual elements, such as the controller, signal correction section, acceleration obtaining section, touch sensing section, resistance measuring units and capacitance measuring units, etc., and it should be understood that the invention is not limited in a way that these elements constitute structural independent units but these elements should be understood as elements comprising different functions. In other words, it is understood by the skilled person that an element in the above-described embodiments is not construed as being limited to a separate tangible part but is understood as a kind of functional entity so that several functions may be provided in one tangible part. For example, as described above, the function of the signal correction section may be incorporated into a controller.

Any one of the above-referenced elements of the touch sensing apparatuses 100, 300 and 400 may be implemented in hardware, software, field-programmable gate array (FPGA), application-specific integrated circuits (ASICs), firmware or the like. In particular, the controller itself may be realized by a microprocessor, computer or integrated circuit and is not limited to the above.

Moreover, the physical entities according to the invention and/or its embodiments, in particular the controller, may comprise or store computer programs including instructions such that, when the computer programs are executed on the physical entities, steps, procedures and functions of these elements are carried out according to embodiments of the invention. The invention also relates to computer programs for carrying out the function of the elements, and to a computer-readable medium storing the computer programs for carrying out methods according to the invention.

It will be appreciated that various modifications and variations can be made in the described elements, touch sensing apparatuses, mobile devices and methods as well as in the construction of this invention without departing from the scope or spirit of the invention. The invention has been described in relation to particular embodiments which are intended in all aspects to be illustrative rather than restrictive. Those skilled in the art will appreciate that many different combinations of hardware, software and firmware are suitable for practising the invention.

Moreover, other implementations of the invention will be apparent to the skilled person from consideration of the specification and practice of the invention disclosed herein. It is intended that the specification and the examples are considered as exemplary only. To this end, it is to be understood that inventive aspects may lie in less than all features of a single foregoing disclosed implementation or configuration. Thus, the true scope and spirit of the invention is indicated by the following claims.

The invention claimed is:

1. Touch sensing apparatus for a mobile device, comprising
   a touch sensing section for sensing a force experienced in a touch sensing direction of said touch sensing section and outputting a signal corresponding to said force;
   an acceleration obtaining section for obtaining an acceleration of said touch sensing apparatus in said touch sensing direction; and
   a signal correction section for correcting said signal corresponding to said sensed force using said obtained acceleration.

2. Touch sensing apparatus of claim 1, further comprising a cover layer defining a touch area to which a force is to be applied.

3. Touch sensing apparatus of claim 2, further comprising a support frame, and wherein said cover layer is adapted to change its shape or position relative to said support frame when a force is applied.

4. The touch sensing apparatus of claim 2, wherein the cover layer is at least partly made of a transparent material.

5. Touch sensing apparatus of claim 2, further comprising a display assembly.

6. The touch sensing apparatus of claim 1, further comprising a touch position sensing unit for sensing a touched position.

7. The touch sensing apparatus of claim 6, further comprising
   a controller adapted to control supply of power to at least one of said touch sensing section, acceleration obtaining section and signal correction section depending on whether said touch position sensing unit senses a touch or not.

8. The touch sensing apparatus of claim 6, wherein power is supplied to at least one of said touch sensing section, acceleration obtaining section and signal correction section if a touch is sensed by said touch position sensing unit.

9. The touch sensing apparatus of claim 1, wherein the acceleration obtaining section comprises an accelerometer to measure acceleration in three directions of a three dimensional coordinate system.

10. The touch sensing apparatus of claim 9, further comprising
    a storage section for storing a compensation value to compensate for a difference between said touch sensing direction and one of said three directions of said accelerometer.

11. The touch sensing apparatus of claim 1, wherein the touch sensing section comprises at least one layer including electrically conductive material to sense a force experienced on said layer.

12. Mobile device comprising said touch sensing apparatus of claim 1.

13. Mobile device, comprising
    a force-sensitive touch sensor for sensing a force experienced in a touch sensing direction of said force-sensitive touch sensor and outputting a signal corresponding to said force;
    an accelerometer for measuring an acceleration of said touch sensing apparatus; and a microcontroller adapted to correct said signal corresponding to said sensed force using said obtained acceleration.

14. Method for touch operation sensing, comprising the steps sensing a force experienced in a touch sensing direction of a touch sensing apparatus and outputting a signal corresponding to said force;

obtaining an acceleration of said touch sensing apparatus in said touch sensing direction; and correcting said signal corresponding to said sensed force using said obtained acceleration.

* * * * *